United States Patent
Hoefken

(10) Patent No.: US 8,651,732 B2
(45) Date of Patent: Feb. 18, 2014

(54) STIRRING DEVICE FOR ACTIVATED SLUDGES

(75) Inventor: Marcus Hoefken, Erlangen (DE)

(73) Assignee: Invent Umwelt-und Verfahrenstechnik AG, Erlangen (DE)

( * ) Notice: Subject to any disclaimer, the term of this patent is extended or adjusted under 35 U.S.C. 154(b) by 1000 days.

(21) Appl. No.: 12/452,952

(22) PCT Filed: Jul. 18, 2008

(86) PCT No.: PCT/EP2008/005924
§ 371 (c)(1),
(2), (4) Date: Mar. 25, 2010

(87) PCT Pub. No.: WO2009/018916
PCT Pub. Date: Feb. 12, 2009

(65) Prior Publication Data
US 2010/0182869 A1    Jul. 22, 2010

(30) Foreign Application Priority Data
Aug. 9, 2007 (DE) .......................... 10 2007 037 586

(51) Int. Cl.
*B01F 7/00* (2006.01)
*B01F 3/04* (2006.01)

(52) U.S. Cl.
USPC ...... 366/343; 366/295; 366/330.1; 366/329.1

(58) Field of Classification Search
USPC ............. 366/343, 330.1, 330.2, 330.3, 330.4, 366/330.5, 330.6, 329.1, 293, 295
See application file for complete search history.

(56) References Cited

U.S. PATENT DOCUMENTS

| | | | | |
|---|---|---|---|---|
| 370,871 A | * | 10/1887 | Hunt | 366/330.1 |
| 2,348,123 A | * | 5/1944 | Green et al. | 210/738 |
| 2,592,709 A | * | 4/1952 | Kinnaird | 366/169.1 |
| 2,633,339 A | * | 3/1953 | Okulitch et al. | 366/330.1 |
| 3,385,576 A | * | 5/1968 | Wikswo | 261/93 |
| 4,066,722 A | * | 1/1978 | Pietruszewski et al. | 261/87 |
| 4,197,092 A | * | 4/1980 | Bretz | 48/86 R |
| 4,663,055 A | * | 5/1987 | Ling et al. | 210/738 |
| 7,163,198 B2 | * | 1/2007 | Hofken | 261/91 |
| 7,784,769 B2 | * | 8/2010 | Hoefken | 261/85 |
| 8,434,744 B2 | * | 5/2013 | Hoefken | 261/93 |

(Continued)

FOREIGN PATENT DOCUMENTS

| | | |
|---|---|---|
| DE | G 91 06 639.5 | 10/1991 |
| DE | 42 18 027 A1 | 12/1992 |
| JP | S61-125426 | 6/1986 |

*Primary Examiner* — Tony G Soohoo
(74) *Attorney, Agent, or Firm* — Manabu Kanesaka

(57) ABSTRACT

The invention relates to a stirring device for activated sludges comprising a hyperboloid stirring body (2) attached to a shaft (1), wherein a plurality of transport ribs (3) are provided on the top (O) of the stirring body (2) running toward the circumferential boundary (UM) thereof, wherein the transport ribs (3) have an oblique course, at least in sections, relative to a radial direction, and wherein an oblique position of the transport ribs (3) is selected such that, when the stirring body (2) rotates in a predetermined rotational direction (R), a flow is generated that is directed radially outward away from the circumferential boundary (UM) of the stirring body (2). In order to improve the efficiency of the stirring device, the invention proposes that at least one propeller (6) be attached to the shaft (1) that, when the stirring body (2) rotates in the rotational direction (R), generates a flow (A) directed toward the top (O) of the stirring body (2).

10 Claims, 1 Drawing Sheet

(56) References Cited

U.S. PATENT DOCUMENTS

| | | | |
|---|---|---|---|
| 8,459,863 B2* | 6/2013 | Hoefken et al. | 366/331 |
| 2007/0297277 A1* | 12/2007 | Tytar | 366/134 |
| 2008/0181053 A1* | 7/2008 | King | 366/343 |
| 2009/0127213 A1* | 5/2009 | Hoefken | 210/800 |
| 2010/0182869 A1* | 7/2010 | Hoefken | 366/343 |
| 2010/0196165 A1* | 8/2010 | Hoefken | 416/223 R |
| 2013/0119173 A1* | 5/2013 | Hackl et al. | 241/98 |

\* cited by examiner

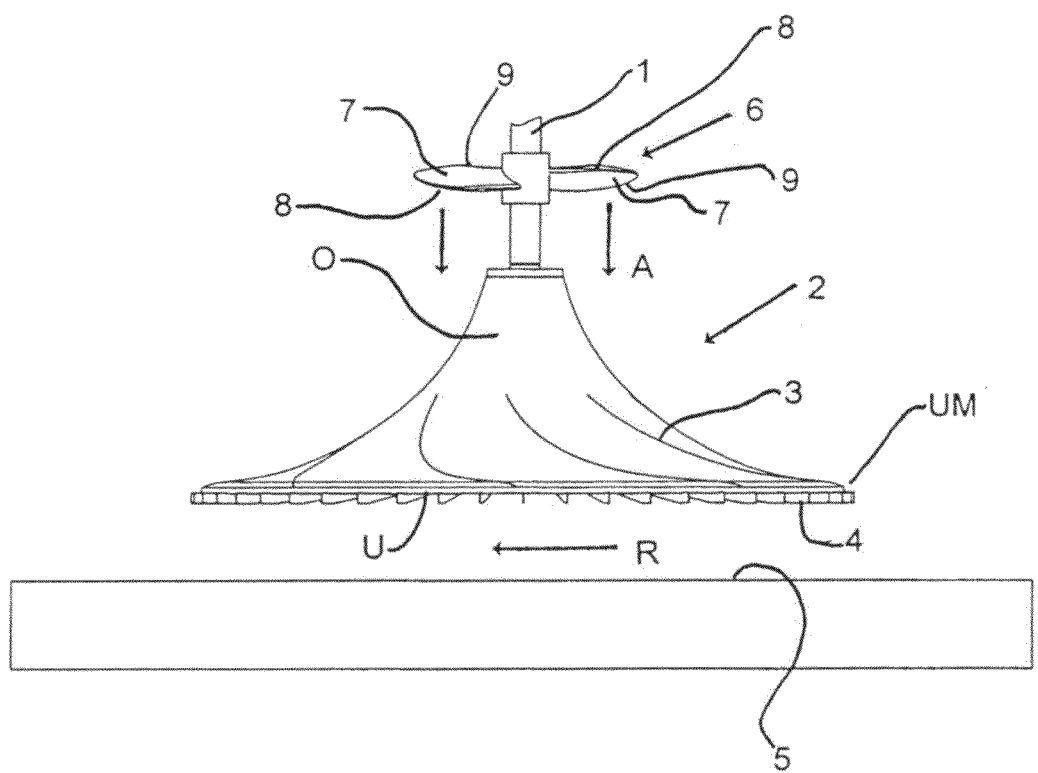

STIRRING DEVICE FOR ACTIVATED SLUDGES

The invention relates to a stirring device for activated sludges as defined in the preamble of claim 1.

Such a stirring device is known from DE 42 18 027 A1. Moreover, it is known from the aforementioned document to attach one knife or a plurality of knives to the shaft to chop up coarse materials. The knives can be inclined at an angle of attack. DE 42 18 027 A1 contains no information about how any eventual flow generated with the inclined knives is directed and whether a directed flow is generated with the known plurality of knives.

In accordance with prior art, a need exists to further improve the stirring efficiency of the generic stirring device.

The object of the present invention is to provide a stirring device with further improved stirring efficiency.

The solution to this object results from the features of claim 1. Useful embodiments of the invention result from the features of claims 2 to 10.

According to the provisions of the invention, it is provided that at least one propeller is attached to the shaft which generates a flow directed towards the upper side of the stirring body during a rotation of the stirring body in the direction of rotation. Due to this flow, the pressure on the upper side of the stirring body is increased. With the transport ribs a still more efficient flow directed away from the circumferential boundary of the stirring body can be generated in the basin. The suggested solution can be implemented easily and inexpensively.

In the sense of the present invention, a "propeller" is understood to mean a flow-mechanically optimized device for the generation of an axial flow directed to the upper side of the stirring body, approximately parallel to the shaft. A propeller wing of the propeller can have an angle of attack which decreases radially to the outside. The propeller wing can be made of an elastic material so that the angle of attack increases as the speed increases, in particular in radially outer areas. A wing of the propeller can have a flow-mechanically optimized profile similar to the wing of an aircraft wing surface. In particular, a leading edge of the wing can be rounded and a trailing edge can be formed pointed towards the end.

In an advantageous embodiment of the invention, it is provided that the transport ribs bend towards the circumferential boundary from an approximately radial direction in an approximately tangential direction directed opposite the direction of rotation. Due to the suggested bent embodiment of the transport ribs, an acceleration of the flow on the upper side can be achieved and thus a further increase in efficiency of the flow directed away from the circumferential boundary of the stirring body.

In a further embodiment, it is provided that the transport ribs only extend in an outer radial section of the upper side. Due to the high angular velocity in the outer radial section, the effect of the transport ribs is particularly great.

A plurality of essentially radially running shear ribs can be provided on an underside opposite the upper side. The shear ribs are used to swirl the air supplied on an underside of the stirring body and thus make air bubbles.

To further increase the efficiency, it is provided that the propeller is attached to the shaft in the vicinity of the stirring body. A plurality of propellers can also be provided on top of each other on the shaft. This enables further acceleration of the flow generated with the propellers and directed to the upper side of the stirring device.

In a further embodiment, it is provided that an end of the shaft extending in the vicinity of the underside of the stirring body is held in a safety bearing. Another end of the shaft is usefully connected to a gear unit motor. Because of the suggested two-sided holder of the shaft at the end, a precise rotary movement around an axis is achieved. Undesired swinging or precession movements of the stirring body are avoided.

In a further embodiment, the gear unit motor can be a submersible motor. In this case, the stirring device is designed as a submersible device.

The gear unit motor is usefully mounted on a frame surrounding the stirring body. In this case, the safety bearing is usefully mounted on the frame. This enables the device to be used in the basin as a mounting unit.

The frame can also be designed like a tower so that a gear unit motor mounted on its pointed top is above the level of the medium to be stirred. That makes the maintenance of the gear unit motor easier.

Naturally, it is also possible to mount the safety bearing on the bottom of the basin.

An exemplary embodiment will now be used to describe the invention in more detail based on the only drawing.

The only drawing shows a partial side view of a stirring device. A hyperboloid-like designed stirring body generally referred to with the reference sign 2 is mounted on a shaft 1. A plurality of transport ribs 3 are provided on an upper side O of the stirring body 2. The transport ribs 3 only extend over a radial, outer section of the upper side O. They bend towards a circumferential boundary UM of the stirring body 2 from an approximate radial direction to an approximate tangential direction directed opposite the direction of rotation marked with the arrow R. Essentially radially running shear ribs 4 are provided on an underside U of the stirring body 2. Reference sign 5 indicates a bottom of a basin (not shown here).

A propeller 6 attached to the shaft 1 in the vicinity of the stirring body 2 has two wings 7 here. A leading edge 8 of each of the wings 7 has a curve running in the radial direction opposite the direction of rotation R. Besides, the leading edge 8 can be rounded in design. A trailing edge 9 is usefully designed pointed at the end.

The function of the stirring device shown is as follows:

With a rotation of the stirring body 2, simultaneously the propeller 6 mounted on the shaft 1 is rotated and, as a result, an axial flow indicated with the arrows A is generated in the direction to the upper side O of the stirring body 2. The axial flow A is diverted by the hyperboloid-like embodiment of the upper side O in an essentially radial direction. It is additionally accelerated by the effect of the transport ribs 3 so that a particularly effective flow directed away from the circumferential boundary UM is generated which flow runs essentially parallel to the bottom 5.

Naturally, a plurality of propellers can be mounted on top of each other on the shaft 1 instead of the one propeller 6 shown here. In this connection, the propellers 6 can have two, three, four or five wings 7. The wings 7 can be staggered. A diameter of the propellers 6 is usefully selected so that it is smaller than the diameter of the stirring body 2. Usefully, the diameter of a propeller 6 is the 0.2 to 0.8-fold, preferably the 0.3 to 0.5-fold, of the stirring body 2. The edges of attack 8 of the propeller blades 7 can have a saber-like curve opposite the direction of rotation R to avoid catching braid-creating impurities.

A pitch of the propeller blades 7 can be different in a direction radial to the outside. To the extent that the propeller blades 7, for example, are made of an elastic plastic material, the pitch can change depending on the speed due to an elastic deformation of the propeller blades 7. With this, a particularly effective, speed-adjusted, axial flow A can be achieved.

LIST OF REFERENCE SIGNS

1 Shaft
2 Stirring body
3 Transport rib
4 Shear rib
5 Bottom
6 Propeller
7 Wing
8 Leading edge
9 Trailing edge
A Axial flow
O Upper side
R Direction of rotation
U Underside
UM Circumferential boundary

The invention claimed is:

1. Stirring device for activated sludges with a hyperboloid-like stirring body (2) attached to a shaft (1),
wherein a plurality of transport ribs (3) running towards its circumferential boundary (UM) is provided on an upper side (O) of the stirring body (2),
wherein the transport ribs (3) are running inclined at least in sections with respect to a radial direction and
wherein an inclination of the transport ribs (3) is selected in such a manner that, when the stirring body (2) rotates in a specified direction of rotation (R), a radial flow pointing away from the circumferential boundary (UM) is generated,
characterized in that
at least one propeller (6) is attached to the shaft (1) which propeller generates a flow (A) directed towards the upper side (O) of the stirring body (2) during a rotation of the stirring body (2) in the direction of rotation (R).

2. Stirring device as defined in claim 1, wherein the transport ribs (3) bend towards the circumferential boundary (UM) from an approximate radial direction in an approximately tangential direction directed opposite the direction of rotation (R).

3. Stirring device as defined in claim 1, wherein the transport ribs (3) only extend in an outer radial section of the upper side (O).

4. Stirring device as defined in claim 1, wherein a plurality of essentially radially running shear ribs (4) is provided on an underside (U) opposite the upper side (O).

5. Stirring device as defined in claim 1, wherein the propeller (6) is attached to the shaft (1) in the vicinity of the stirring body (2).

6. Stirring device as defined in claim 1, wherein an end of the shaft (1) extending in the vicinity of the underside (U) of the stirring body (2) is held in a safety bearing.

7. Stirring device as defined in claim 1, wherein another end of the shaft (1) is connected to a gear unit motor.

8. Stirring device as defined in claim 1, wherein the gear unit motor is a submersible motor.

9. Stirring device as defined in claim 1, wherein the gear unit motor is mounted on a frame surrounding the stirring body (2).

10. Stirring device as defined in claim 1, wherein the safety bearing is mounted on the frame or on the bottom (5) of a basin.

* * * * *